O. SCHWIMMER.
EYEGLASS ATTACHMENT.
APPLICATION FILED JUNE 20, 1911.
1,030,545.
Patented June 25, 1912.
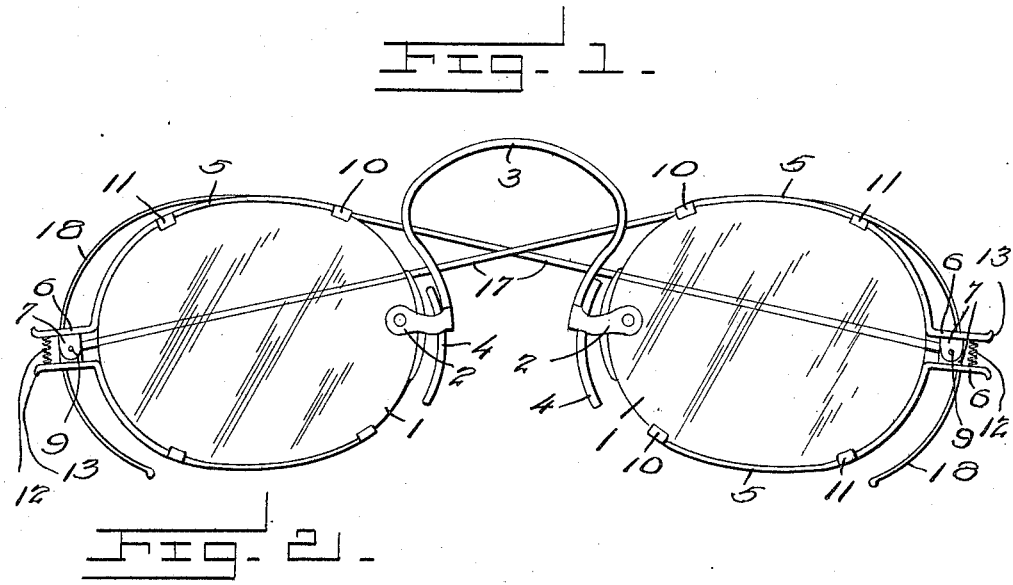
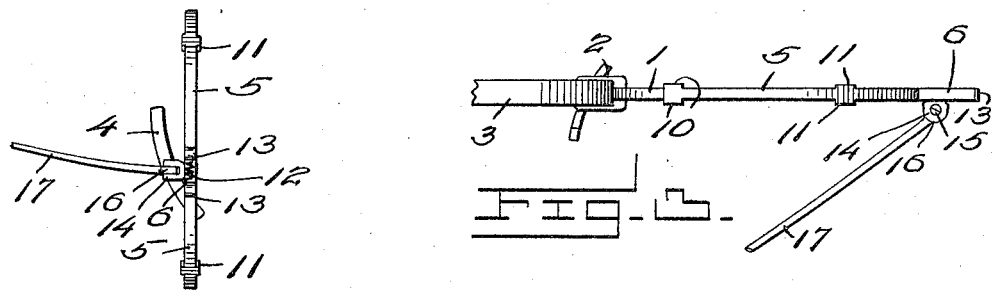
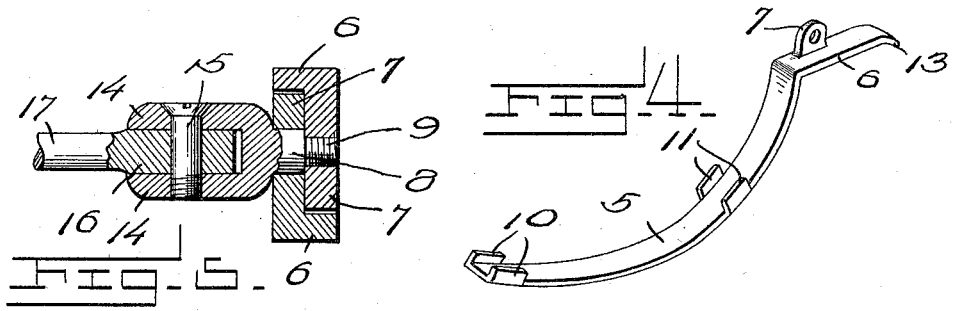
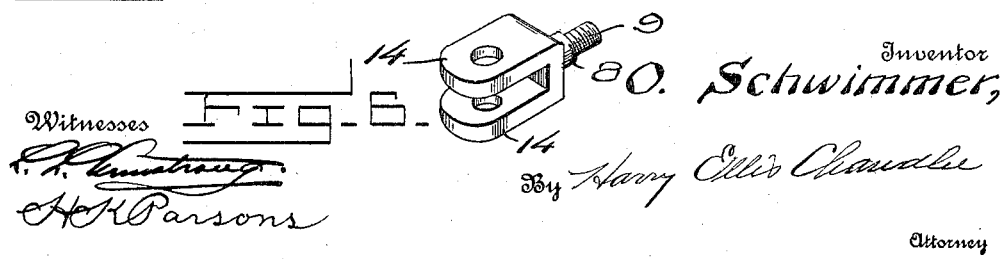
Witnesses
Inventor
O. Schwimmer,
By Harry Ellis Chandler
Attorney

UNITED STATES PATENT OFFICE.

OSCAR SCHWIMMER, OF LOS ANGELES, CALIFORNIA.

EYEGLASS ATTACHMENT.

1,030,545.   Specification of Letters Patent.   Patented June 25, 1912.

Application filed June 20, 1911. Serial No. 634,330.

*To all whom it may concern:*

Be it known that I, OSCAR SCHWIMMER, a citizen of the United States, residing at Los Angeles, in the county of Los Angeles and State of California, have invented certain new and useful Improvements in Eyeglass Attachments, of which the following is a specification.

My invention relates to improvements in eyeglass attachments and has for its leading object the provision of an improved attachment for ordinary pince-nez lenses which will transform the said nose glasses into temple bearing spectacles.

A further object of my invention is the provision of an attachment which may be readily secured to or removed from the lenses of ordinary nose glasses, which attachment will serve to secure bows to the lenses which will serve to engage the ears of the wearer of the glasses and supplement the action of the nose grips in securing the glasses in position.

Other objects and advantages of my improved eyeglass attachment will be readily apparent by reference to the following description taken in connection with the accompanying drawings, and it will be understood that I may make any modifications in the specific structure shown and described within the scope of my claims without departing from or exceeding the spirit of my invention.

Figure 1 represents a front view of a pair of glasses equipped with my improved attachment. Fig. 2 represents an end view of the same. Fig. 3 represents a plan view of my attachment. Fig. 4 represents a perspective view of one of the clamp members. Fig. 5 represents a sectional view of the joint between the clamps, and Fig. 6 represents a perspective view of the pivot post.

In the drawings, the numeral 1 designates the lenses of an ordinary pair of nose glasses, said glasses having the clamps 2 of the spring bridge 3 secured thereto, said bridge also bearing the nose grips 4 for retaining the glasses on the nose of the wearer.

My improved attachment for said nose glasses comprises a similar pair of curved gripping members or arms 5 having the straight portions 6 from which extend inward the flanges 7, while passing through the flanges 7 of said members is the main portion of the pivot post having an enlarged smooth portion 8 rotatably engaged in one of said flanges and having a reduced threaded end 9 screwed into an internally threaded socket formed in the other flange, said post thus serving to pivotally secure the two flanges 7 together.

The curved arms 5 are made of a shape to readily fit around the lenses 1, said arms having at their ends the enlarged portions providing downwardly bent ears 10 spaced apart a sufficient distance to allow of the ready insertion of the lenses therebetween, while the arms are further provided intermediate their length with a second set of ears 11 adapted to lie on opposite sides of the lenses to prevent slipping of the arms. Interposed between the ends of the portions 6 exterior to the pivot flanges 7 is the helical spring 12 which bears against the inner faces of the portion 6 and tends to force their outer ends apart to swing the arms 5 on the pivot 8 into clamping engagement with the edges of the lens, the ends of the spring being suitably secured to the portions 6 and said portions 6 having outwardly bent or flaring ends 13 to permit of the more ready grasping and forcing together to release the clamp arm 5 from the lens 1.

The pivot post of my improved attachment is formed with the bifurcated ends 14, while pivoted between the furcations by the pivot screw 15 is the flattened end 16 of the bow or temple arm 17 having the curved loop 18 for engaging the ear of the wearer of the glasses in the usual manner.

From the foregoing description taken in connection with the drawings the construction of my improved eyeglass attachment will be readily understood, and it will be seen that I have provided an attachment which may be quickly secured to or disengaged from an ordinary pair of eyeglasses without marring, injuring or in any way altering the appearance or construction of the frame or lenses of the said glasses, which attachment will transform the nose glasses which are normally liable to slip from the nose of the wearer into spectacles which will be firmly retained in position.

It will further be observed that my device will be a great saving in that by its use it will merely be necessary for wearers of glasses requiring specially ground lenses to have said lenses mounted in a nose glass frame and then by the use of my attachment the glasses may be worn either as nose glasses or as spectacles doing away with the necessity of purchasing both styles of glasses.

I claim:

1. The combination with a pair of lens engaging arms having inwardly projecting flanges, of a pivot post passing through the flanges for connecting the same, a spring interposed between the outer ends of the arms for forcing them into engagement with the a lens, and an ear bow pivoted to the outer end of the pivot post.

2. The combination with a pince-nez lens, of a pair of arms fitting against the edges of the lens, a post intermediately pivotally connecting the said arms, a spring interposed between the outer ends of the arms for forcing the same into engagement with the lens, and means pivoted to one end of the post for retaining the glasses in correct position relative to the eyes of the wearer.

3. An attachment for eyeglasses, comprising arms of a curvature to fit around the lenses of the glasses, said arms having inwardly projecting ears between which the lenses fit, the arms being further formed with straight outwardly projecting portions having inwardly extending flanges, a pivot post passing through the flanges and pivotally securing the flanges and thus the arms together, springs for forcing the arms toward each other to cause the same to clampingly engage the lenses, the pivot post having a projecting bifurcated end, and an ear engaging bow having one end pivoted between the furcations of the pivot post.

In testimony whereof I affix my signature, in the presence of two witnesses.

OSCAR SCHWIMMER.

Witnesses:
 THOS. R. PERRY,
 H. H. ARNOLD.

---

Copies of this patent may be obtained for five cents each, by addressing the "Commissioner of Patents, Washington, D. C."